United States Patent
Cheung et al.

(10) Patent No.: US 8,171,789 B2
(45) Date of Patent: May 8, 2012

(54) DYNAMIC BALANCING APPARATUS AND METHOD USING SIMPLE HARMONIC ANGULAR MOTION

(75) Inventors: Wan Sup Cheung, Daejeon (KR); Jong Yeon Lim, Daejeon (KR); Sae Won Yoon, Daejeon (KR)

(73) Assignee: Korea Research Institute of Standards and Science, Daejeon (KR)

( * ) Notice: Subject to any disclaimer, the term of this patent is extended or adjusted under 35 U.S.C. 154(b) by 502 days.

(21) Appl. No.: 12/382,773

(22) Filed: Mar. 24, 2009

(65) Prior Publication Data
US 2009/0255334 A1 Oct. 15, 2009

(30) Foreign Application Priority Data
Mar. 25, 2008 (KR) .................. 10-2008-0027293

(51) Int. Cl.
G01M 1/02 (2006.01)
G01M 1/00 (2006.01)
(52) U.S. Cl. .......................... 73/462; 73/460
(58) Field of Classification Search .................. 73/462, 73/460, 468, 146
See application file for complete search history.

(56) References Cited

U.S. PATENT DOCUMENTS

| | | | | |
|---|---|---|---|---|
| 3,091,125 A * | 5/1963 | Hack et al. | ...... | 73/462 |
| 4,018,087 A * | 4/1977 | Wenz | ...... | 73/146 |
| 4,285,240 A * | 8/1981 | Gold | ...... | 73/462 |
| 4,302,813 A * | 11/1981 | Kurihara et al. | ...... | 702/56 |
| 4,366,707 A * | 1/1983 | Jarschel | ...... | 73/146 |
| 4,445,237 A | 5/1984 | Paul | | |
| 5,481,912 A * | 1/1996 | Himmler | ...... | 73/460 |
| 6,546,635 B1 * | 4/2003 | Gerdes | ...... | 33/203.13 |
| 7,065,444 B2 * | 6/2006 | Braghiroli | ...... | 701/124 |

FOREIGN PATENT DOCUMENTS

JP 2005-134278 5/2005

* cited by examiner

*Primary Examiner* — Helen C. Kwok
(74) *Attorney, Agent, or Firm* — Clark & Brody

(57) ABSTRACT

Provided is a dynamic balancing apparatus using a simple harmonic angular motion, including a rotational shaft on which a rotational body having an unbalanced mass is installed; a simple angular motion generator for periodically vibrating the rotational shaft; a support for supporting both sides of the rotational shaft; an angular vibration measuring sensor for measuring the simple harmonic angular motion of the rotational shaft; and force or vibration transducers for measuring applied force acting on or vibration transferred to the support by means of the simple harmonic motion of the unbalance mass.

6 Claims, 3 Drawing Sheets

DYNAMIC BALANCING APPARATUS AND METHOD USING SIMPLE HARMONIC ANGULAR MOTION

TECHNICAL FIELD

The present invention relates to a dynamic balancing apparatus and effective balancing methods using a simple harmonic angular motion, which can precisely measure the angle and magnitude of the unbalanced mass of a rotational body using angular vibration, i.e., a simple harmonic angular vibration having the rotational amplitude and period.

BACKGROUND ART

All components of a rotating machine are primarily machined along the rotational axis of manufacturing machinery thereof. A dynamic balancing apparatus is used to measure the position, i.e., angle, and magnitude of an unbalanced mass which exists with respect to an actual rotational axis after the components are assembled.

A dynamic balancing method is a theoretical method which is used in the dynamic balancing apparatus to measure the position, and magnitude of a rotating unbalanced mass.

In order to measure the unbalancing mass, most commercially used dynamic balancing apparatuses are used to measure a centrifugal force generated from the unbalanced mass when a balancing test piece is rotated at a certain speed, or indirectly measure the vibration of a support generated by the centrifugal force, thereby estimating the position and magnitude of an unbalanced mass.

In the conventional balancing method, if a rotational body has a very heavy weight, it may be impossible to directly rotate the rotational body, and thus it needs an additional device for rotating the rotational body very slowly and gradually.

Particularly, in case of fans or blowers, since the centrifugal force or corresponding vibration is disturbed by air flow generated when they are rotated, it is difficult to measure the unbalanced mass accurately.

Furthermore, since the conventional balancing apparatus needs an accelerating time until reaching a certain rotating speed from the initial state and a decelerating time which is required to stop the rotating state safely, it takes lots of time to complete the dynamic balancing.

DISCLOSURE OF THE INVENTION

It is an object of the present invention to provide a dynamic balancing apparatus and effective balancing methods using a simple harmonic angular motion, which enables dynamic balancing without an additional device for rotating a rotational body although it is impossible to directly rotate the heavily weighted rotational body.

It is another object of the present invention to provide a dynamic balancing apparatus and effective balancing methods using a simple harmonic angular motion, which measure the dynamic balancing in a state of minimizing the influence of air flow generated from the revolution of fans or blowers.

It is yet another object of the present invention to provide a dynamic balancing apparatus and effective balancing methods using a simple harmonic angular motion, which reduce both the accelerating time and the decelerating time required in balancing rotational components using the conventional balancing machines.

To solve the above-mentioned objects, the present invention provides a dynamic balancing apparatus using a simple harmonic angular motion, including a rotational shaft 10 on which a rotational body 1 having a rotating unbalanced mass is installed; a periodic angular vibration generator 20 for periodically vibrating the rotational shaft 10; a support 30 for supporting both sides of the rotational shaft 10; and a transducer 40 for measuring applied force or vibration transferred to the support 30 by revolution of the rotational shaft 10 having the periodic angular motion.

Preferably, the dynamic balancing apparatus further comprises an angular vibration measuring sensor 50 for measuring the amplitude generated by the periodic angular motion the rotational shaft 10.

Furthermore, the present invention provides dynamic balancing methods using a simple harmonic angular motion, including: periodically vibrating a rotational shaft 10, on which a rotational body 1 having an unbalanced mass is installed, so as to generate the periodic angular motion by an unbalanced mass of the rotational body 1; measuring linear vibration generated by normal force and centrifugal force, or the two forces generated by the rotating unbalanced mass of the rotational body 1 at the support 30 which supports the rotational shaft 10 having the periodic angular motion; estimating frequency components of the measured normal centrifugal forces; and estimating the angle and magnitude of the unbalanced mass of the rotational body 1 using components of the measured tangential and centrifugal forces and characteristics of the frequency components of the tangential and centrifugal forces.

Preferably, the magnitude of the rotating unbalanced mass of the rotational body 1 is determined by the following equations:

$$F_X(t) = -F_t \cdot \sin(\theta(t)) + F_n \cdot \cos(\theta(t))$$
$$= -mr \cdot A_\theta \cdot (2\pi f)^2 \cdot \sin(2\pi ft) \cdot \sin\{A_\theta \cdot \sin(2\pi ft) + \theta_0\} +$$
$$mr \cdot A_\theta^2 \cdot (2\pi f)^2 \cdot \frac{1}{2}\{1 + \cos(4\pi ft)\} \cdot \cos\{A_\theta \cdot \sin(2\pi ft) + \theta_0\}$$

$$F_Y(t) = F_t \cdot \cos(\theta(t)) + F_n \cdot \sin(\theta(t))$$
$$= mr \cdot A_\theta \cdot (2\pi f)^2 \cdot \sin(2\pi ft) \cdot \cos\{A_\theta \cdot \sin(2\pi ft) + \theta_0\} +$$
$$mr \cdot A_\theta^2 \cdot (2\pi f)^2 \cdot \frac{1}{2}\{1 + \cos(4\pi ft)\} \cdot \sin\{A_\theta \cdot \sin(2\pi ft) + \theta_0\}$$

wherein $F_x(t)$ is the horizontal component of each of the tangential and centrifugal forces acting on the support 30 by the rotating unbalanced mass of the rotational body 1; $F_y(t)$ is the vertical component of each of the tangential force $F_t$ and the centrifugal force $F_n$ acting on the support 30 by the rotating unbalanced mass of the rotational body 1; f[Hz] is the angular vibration frequency; $A_\theta$[radians] is the amplitude of the simple harmonic angular motion; $\theta(t)$ is the angular displacement of the rotational shaft; $\omega(t)$ is the angular velocity; $\alpha(t)$ is the angular acceleration; m[kg] is the unbalanced mass of the rotational body; r[m] is the distance of the rotating unbalanced mass from the rotational axis, which is spaced apart from the rotational shaft 10; and $\theta_0$[radians] is the angle with respect to the rotation reference point of the rotational shaft.

Preferably, the angle of the unbalanced mass of the rotational body 1 is determined from the frequency components of the tangential force and the centrifugal force acting on the support 30 generated from the rotating unbalanced mass of the rotational body 1, and the frequency components are calculated by the following equations:

$$C_{F_X}(k) = \frac{2}{T}\int_0^T F_X(t) \cdot \cos(k \cdot 2\pi ft)\,dt$$

$$= \begin{cases} mr \cdot A_\theta \cdot (2\pi f)^2 \cdot \\ \{k \cdot S_{sin}(A_\theta; k-1) + & \text{for } k = 2, 4, 6, \ldots \\ k \cdot S_{sin}(A_\theta; k+1)\} \cdot \cos(\theta_0) \\ 0 & \text{for } k = 1, 3, 5, \ldots \end{cases}$$

$$S_{F_X}(k) = \frac{2}{T}\int_0^T F_X(t) \cdot \sin(k \cdot 2\pi ft)\,dt$$

$$= \begin{cases} mr \cdot A_\theta \cdot (2\pi f)^2 \cdot & \text{for } k = 1, 3, 5, \ldots \\ \{-k \cdot C_{cos}(A_\theta; k-1) - k \cdot \\ C_{cos}(A_\theta; k+1)\} \cdot \sin(\theta_0) \\ 0 & \text{for } k = 2, 4, 6, \ldots \end{cases}$$

$$C_{F_Y}(k) = \frac{2}{T}\int_0^T F_Y(t) \cdot \cos(k \cdot 2\pi ft)\,dt$$

$$= \begin{cases} mr \cdot A_\theta \cdot (2\pi f)^2 \cdot & \text{for } k = 2, 4, 6, \ldots \\ \{k \cdot S_{sin}(A_\theta; k-1) + k \cdot \\ S_{sin}(A_\theta; k+1)\} \cdot \sin(\theta_0) \\ 0 & \text{for } k = 1, 3, 5, \ldots \end{cases}$$

$$S_{F_Y}(k) = \frac{2}{T}\int_0^T F_Y(t) \cdot \sin(k \cdot 2\pi ft)\,dt$$

$$= \begin{cases} mr \cdot A_\theta \cdot (2\pi f)^2 \cdot & \text{for } k = 1, 3, 5, \ldots \\ \{k \cdot C_{cos}(A_\theta; k-1) + k \cdot \\ C_{cos}(A_\theta; k+1)\} \cdot \cos(\theta_0) \\ 0 & \text{for } k = 2, 4, 6, \ldots \end{cases}$$

wherein $C_{Fx}$ and $S_{Fx}$ are cosine and sine components corresponding to the Fourier coefficients of the horizontal force $F_X(t)$; $C_{Fy}$ and $S_{Fy}$ are cosine and sine components corresponding to the Fourier coefficients of the vertical force $F_Y(t)$; T is the period corresponding to the periodic angular vibration frequency f [Hz]; m[kg] is the unbalanced mass of the rotational body; r[m] is the distance of the unbalanced mass of the rotational body, which is spaced apart from the rotational shaft 10; $\theta_0$[radians] is the an angle from the rotation reference point of the rotational shaft; $A_\theta$[radians] is the amplitude of the simple harmonic angular motion; $\theta(t)$ is the angular displacement of the rotational shaft; and k is an integer indicating the order of the Fourier coefficients;

$$C_{cos}(A_\theta; k) = \frac{1}{T}\int_0^T \cos(k \cdot 2\pi ft) \cdot \cos\{A_\theta \cdot \sin(2\pi ft)\}\,dt,$$

$$C_{cos}(A_\theta; k) \neq 0 \text{ for } k = 2, 4, 6, \ldots$$

$$S_{sin}(A_\theta; k) = \frac{1}{T}\int_0^T \sin(k \cdot 2\pi ft) \cdot \sin\{A_\theta \cdot \sin(2\pi ft)\}\,dt,$$

$$S_{sin}(A_\theta; k) \neq 0 \text{ for } k = 1, 3, 5, \ldots$$

$$C_{sin}(A_\theta; k) = \frac{1}{T}\int_0^T \sin(k \cdot 2\pi ft) \cdot \cos\{A_\theta \cdot \sin(2\pi ft)\}\,dt = 0,$$

for $k = 1, 2, 3, \ldots$ $$S_{cos}(A_\theta; k) = \frac{1}{T}\int_0^T \cos(k \cdot 2\pi ft) \cdot \sin\{A_\theta \cdot \sin(2\pi ft)\}\,dt = 0,$$

for $k = 1, 2, 3, \ldots$ $$C_{cos}(A_\theta; k) = \frac{1}{T}\int_0^T \cos\{A_\theta \cdot \sin(2\pi ft)\}\,dt, \text{ for } k = 0$$

$$C_{sin}(A_\theta; 0) = S_{cos}(A_\theta; 0) = S_{sin}(A_\theta; 0) = 0$$

Preferably, an unbalanced amount m·r related to the unbalanced mass of the rotational body 1 is determined by the following equation using the tangential force and the centrifugal force acting on the horizontal and vertical directions:

$$\begin{bmatrix} S_{F_X}(1) \\ S_{F_Y}(1) \\ C_{F_X}(2) \\ C_{F_Y}(2) \\ S_{F_X}(3) \\ S_{F_Y}(3) \\ C_{F_X}(4) \\ C_{F_Y}(4) \\ \Box \\ \Box \end{bmatrix} =$$

$$A_\theta \cdot (2\pi f)^2 \begin{bmatrix} 0 & -C_{cos}(A_\theta, 0) - C_{cos}(A_\theta, 2) \\ C_{cos}(A_\theta, 1) + C_{cos}(A_\theta, 3) & 0 \\ 2S_{sin}(A_\theta, 1) + 2S_{sin}(A_\theta, 3) & 0 \\ 0 & 2S_{sin}(A_\theta, 1) + 2S_{sin}(A_\theta, 3) \\ 0 & -3C_{cos}(A_\theta, 2) - 3C_{cos}(A_\theta, 4) \\ 3C_{cos}(A_\theta, 2) + 3C_{cos}(A_\theta, 4) & 0 \\ 4S_{sin}(A_\theta, 3) + 4S_{sin}(A_\theta, 5) & 0 \\ 0 & 4S_{sin}(A_\theta, 3) + 4S_{sin}(A_\theta, 5) \\ \Box & \Box \\ \Box & \Box \end{bmatrix}$$

$$\begin{bmatrix} U_{cos} \\ U_{sin} \end{bmatrix}$$

wherein $U_{cos}$ is the cosine component of the unbalanced amount ($U_{cos}$=mr·cos($\theta_0$)) and $U_{sin}$ is the sine component ($U_{sin}$=mr·sin($\theta_0$)), and $$U = mr = \sqrt{U_{cos}^2 + U_{sin}^2}, \quad \theta_0 = \tan^{-1}\left(\frac{U_{sin}}{U_{cos}}\right).$$

DETAILED DESCRIPTION OF MAIN ELEMENTS

1: rotational body
10: rotational shaft
20: simple harmonic angular vibration generator
30: support
40: force or vibration transducer
50: angular vibration measuring sensor

BEST METHOD FOR CARRYING OUT THE INVENTION

Practical and presently preferred embodiments of the present invention are illustrative as shown in the following embodiment.

However, it will be appreciated that those skilled in the art, on consideration of this disclosure, may make modifications and improvements within the spirit and scope of the present invention.

Figure 1:
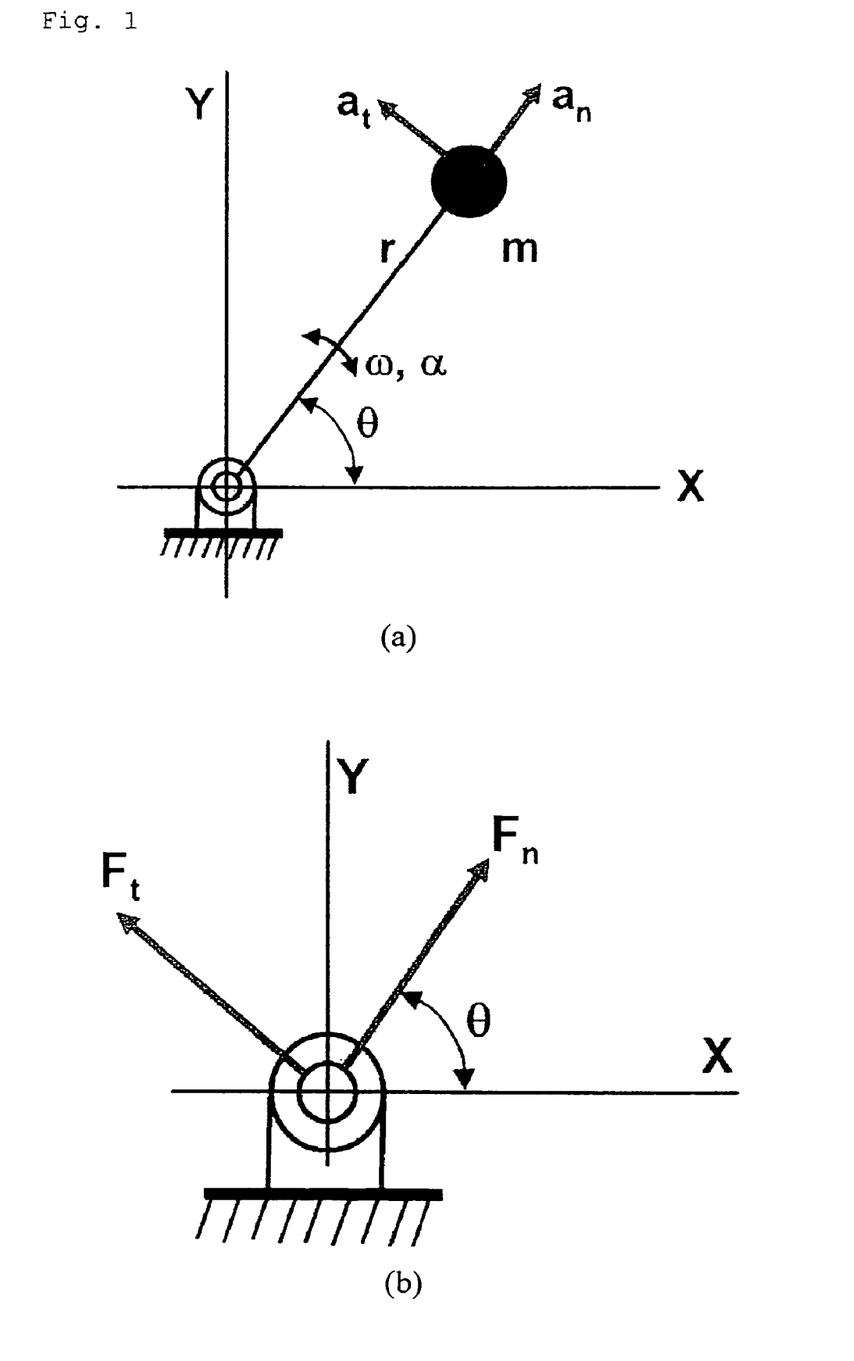
FIG. 1 is conceptual drawings that show force components exerted to the support and acceleration components of an unbalanced mass.
Figure 2:
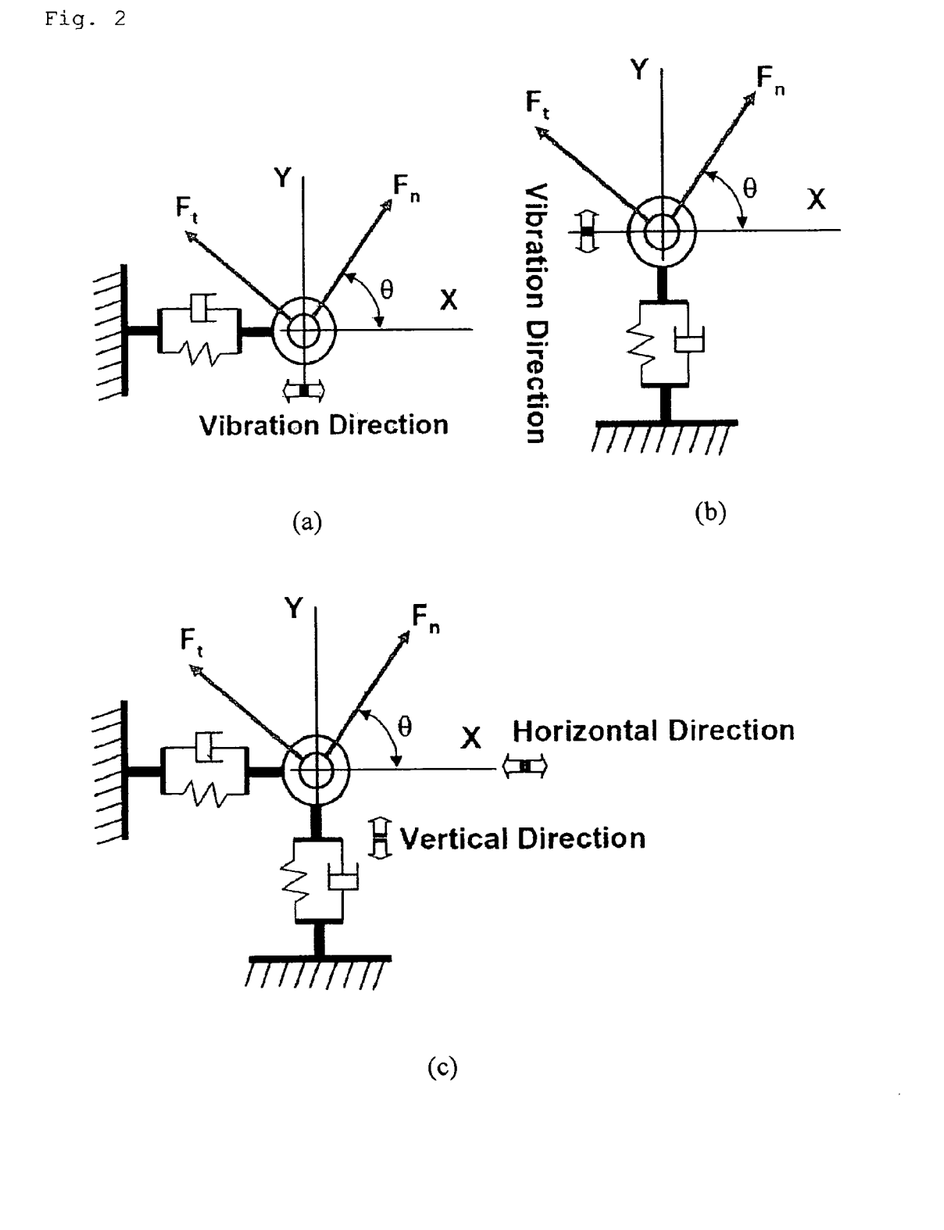
FIG. 2 is schematic drawings that show the vibration models of the support.
Figure 3:
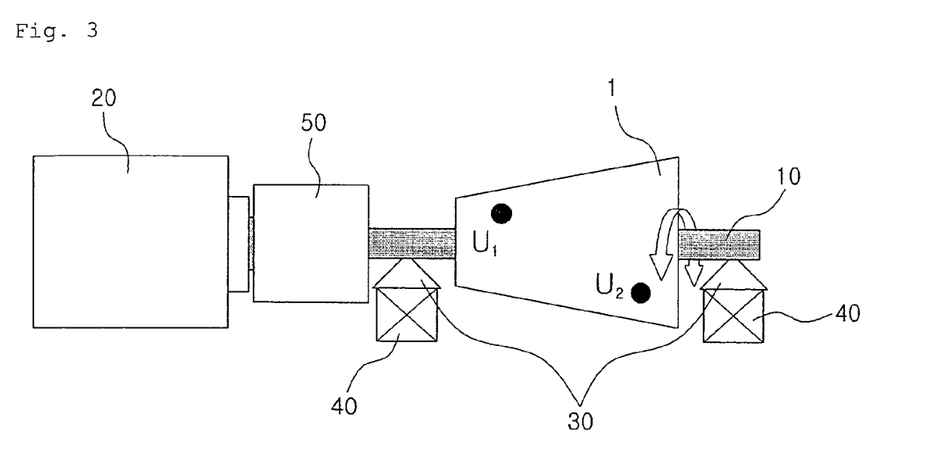
FIG. 3 is a configuration drawing that shows the structure of a dynamic balancing apparatus using a simple harmonic angular motion, i.e., periodic angular vibration.

FIG. 1 is conceptual drawings showing the force components exerted to the support and acceleration components of an unbalanced mass and FIG. 2 is schematic drawings showing the vibration models of the support. FIG. 3 is a configuration drawing showing the structure of a dynamic balancing apparatus using a simple harmonic angular motion, i.e. a periodic angular vibration.

In a simple harmonic motion having the angular vibration amplitude $A_\theta$[radians] and the frequency f[Hz] which are applied to a rotational body attached to the rotational shaft 10 in drawings, the angular displacement $\theta(t)$ of a rotational shaft, its angular velocity $\omega(t)$ and angular acceleration $\alpha(t)$ can be expressed by the following equations.

$$\theta(t) = A_\theta \cdot \sin(2\pi ft) + \theta_0,$$

$$\omega(t) = d\theta(t)/dt = 2\pi f \cdot A_\theta \cdot \cos(2\theta ft),$$

$$\alpha(t) = d^2\theta(t)/dt^2 = -(2\pi f)^2 \cdot A_\theta \cdot \sin(2\pi ft) \quad \text{Eq. 1}$$

A mass[kg] spaced by the distance r[m] from the rotational shaft 10 and positioned at the angle $\theta_0$[radians] from the angular reference point is moved with an acceleration $a_t(t)$ in the tangential direction and an acceleration $a_n(t)$ in the normal direction as shown in FIG. 1A. As shown in FIG. 1B, these two acceleration components act as reaction force such as tangential force $F_t(t)$ and centrifugal force $F_n(t)$ with respect to the support, respectively.

$$F_t(t) = -m \cdot a_t(t) = -mr \cdot \alpha(t) = mr \cdot (2\pi f)^2 \cdot A_\theta \cdot \sin(2\pi ft) \quad \text{Eq. 2}$$

$$F_n(t) = -m \cdot a_n(t) = mr \cdot \omega^2(t) = mr \cdot (2\pi f)^2 \cdot A_\theta^2 \cdot \frac{1}{2}\{1 + \cos(4\pi ft)\},$$

It can be understood that the tangential force represents a periodic function which is the same as the angular vibration frequency and that the centrifugal force has a DC component and another component of a frequency function corresponding to twice of the angular vibration frequency. The tangential force and the centrifugal force can be respectively decomposed into the horizontal component $F_X(t)$ and the vertical component $F_Y(t)$ as follows.

$$F_X(t) = -F_t \cdot \sin(\theta(t)) + F_n \cdot \cos(\theta(t)) \quad \text{Eq. 3}$$
$$= -mr \cdot A_\theta \cdot (2\pi f)^2 \cdot \sin(2\pi ft) \cdot \sin\{A_\theta \cdot \sin(2\pi ft) + \theta_0\} +$$
$$mr \cdot A_\theta^2 \cdot (2\pi f)^2 \cdot \frac{1}{2}\{1 + \cos(4\pi ft)\} \cdot \cos\{A_\theta \cdot \sin(2\pi ft) + \theta_0\}$$

$$F_Y(t) = F_t \cdot \cos(\theta(t)) + F_n \cdot \sin(\theta(t)) \quad \text{Eq. 4}$$
$$= mr \cdot A_\theta \cdot (2\pi f)^2 \cdot \sin(2\pi ft) \cdot \cos\{A_\theta \cdot \sin(2\pi ft) + \theta_0\} +$$
$$mr \cdot A_\theta^2 \cdot (2\pi f)^2 \cdot \frac{1}{2}\{1 + \cos(4\pi ft)\} \cdot \sin(A_\theta \cdot \sin(2\pi ft) + \theta_0)$$

As described above, it can be understood that these horizontal and vertical forces depend on both the unbalanced amount (mr: an amount defined as the multiplication of mass and radius) and the angle $\theta_0$. This fact means a method of estimating the unbalanced amount and the angle by measuring at the support 30 the horizontal and vertical forces generated from the unbalanced mass of the rotational body having the simple harmonic angular motion, i.e., a new principle of balancing method. The balancing method of the present invention uses the components of tangential and centrifugal forces all together, and also exploits the characteristics of harmonic functions of the two forces, i.e., characteristics of frequency components in estimating the unbalanced amount and the angle.

As described above, the tangential force and the centrifugal force generated by the unbalanced mass according to the simple harmonic angular motion are formed by multiplication and addition of periodic functions corresponding to integer times of an excitation frequency, i.e., sine and cosine functions.

Therefore, by obtaining the frequency components corresponding to the integer times of the excitation frequency in the tangential and centrifugal forces, it is possible to estimate the magnitude and the angle of the unbalanced mass of the rotational body.

First of all, cosine components $C_{Fx}$ and sine components $S_{Fx}$ corresponding to the Fourier coefficients with respect to the horizontal force are as follows.

$$C_{F_X}(k) = \frac{2}{T}\int_0^T F_X(t) \cdot \cos(k \cdot 2\pi ft)\,dt \quad \text{Eq. 5}$$
$$= \begin{cases} mr \cdot A_\theta \cdot (2\pi f)^2 \cdot \\ \{k \cdot S_{sin}(A_\theta; k-1) + & \text{for } k = 2, 4, 6, \ldots \\ k \cdot S_{sin}(A_\theta; k+1)\} \cdot \cos(\theta_0) \\ 0 & \text{for } k = 1, 3, 5, \ldots \end{cases}$$

$$S_{F_X}(k) = \frac{2}{T}\int_0^T F_X(t) \cdot \sin(k \cdot 2\pi ft)\,dt \quad \text{Eq. 6}$$
$$= \begin{cases} mr \cdot A_\theta \cdot (2\pi f)^2 \cdot \\ \{-k \cdot C_{cos}(A_\theta; k-1) - & \text{for } k = 1, 3, 5, \ldots \\ k \cdot C_{cos}(A_\theta; k+1)\} \cdot \sin(\theta_0) \\ 0 & \text{for } k = 2, 4, 6, \ldots \end{cases}$$

In the above equations, k is an integer indicating the order of Fourier coefficients, and T is the period corresponding to the excitation frequency f[Hz], wherein T=1/f. Resultantly, it can be understood that the cosine components $C_{Fx}$ of the Fourier coefficients of the force measured in the horizontal direction can be used to determine the magnitude which is proportional to the cosine component $\cos(\theta_0)$ of the angle of the unbalanced mass, and that the sine components $S_{Fx}$ of the Fourier coefficient can be also used to determine a magnitude which is proportional to the sine component $\sin(\theta_0)$ of the angle of the unbalanced mass. The cosine component $\cos(\theta_0)$ of the angle of the unbalanced mass can be determined from the force measured in the horizontal direction using even-order terms of the Fourier coefficients, and the sine component $\sin(\theta_0)$ of the angle of the rotating unbalanced mass can be determined using odd-order terms of the Fourier coefficients. A method of optimally determining the angle and the magnitude of the unbalanced mass using those multiple cosine and sine terms will be described later. The cosine and sine components $C_{Fy}$ and $S_{Fy}$ corresponding to the Fourier coefficients of the vertical force are obtained as follows.

$$C_{Fy}(k) = \frac{2}{T}\int_0^T F_Y(t)\cdot\cos(k\cdot 2\pi ft)\,dt \qquad \text{Eq. 7}$$

$$= \begin{cases} mr\cdot A_\theta\cdot(2\pi f)^2\cdot \\ \{k\cdot S_{sin}(A_\theta; k-1)+ & \text{for } k=2,4,6,\ldots \\ k\cdot S_{sin}(A_\theta; k+1)\}\cdot\sin(\theta_0) \\ 0 & \text{for } k=1,3,5,\ldots \end{cases}$$

$$S_{Fy}(k) = \frac{2}{T}\int_0^T F_Y(t)\cdot\sin(k\cdot 2\pi ft)\,dt \qquad \text{Eq. 8}$$

$$= \begin{cases} mr\cdot A_\theta\cdot(2\pi f)^2\cdot \\ \{k\cdot C_{cos}(A_\theta; k-1)+ & \text{for } k=1,3,5,\ldots \\ k\cdot C_{cos}(A_\theta; k+1)\}\cdot\cos(\theta_0) \\ 0 & \text{for } k=2,4,6,\ldots \end{cases}$$

From the above results, it can be understood that the cosine components $C_{Fy}$ of the Fourier coefficients of the force measured in the vertical direction can be used to determine the magnitude which is proportional to the sine component $\sin(\theta_0)$ of the angle of the unbalanced mass, and that the sine components $S_{Fy}$ of the Fourier coefficients can be also used to determine the magnitude which is proportional to the cosine component $\cos(\theta_0)$ of the angle of the unbalanced mass. The cosine component $\cos(\theta_0)$ of the angle of the unbalanced mass can be determined from the force measured in the vertical direction using odd-order terms of the Fourier coefficients, and that the sine component $\sin(\theta_0)$ of the angle of the unbalanced mass can be determined using even-order terms of the Fourier coefficients. Similarly in the horizontal force, the angle and the magnitude of the unbalanced mass can be estimated using the Fourier coefficients of the vertical force.

In the equations 7 and 8, functions $C_{cos}(\ )$ and $S_{sin}(\ )$ contained in the Fourier coefficients are integral function defined by the following equations. Analytical equations or descriptions regarding to the integral equations are not yet known, but they can be easily calculated by using numerical methods.

$$C_{cos}(A_\theta; k) = \frac{1}{T}\int_0^T \cos(k\cdot 2\pi ft)\cdot\cos\{A_\theta\cdot\sin(2\pi ft)\}\,dt, \qquad \text{Eq. 9}$$

$$C_{cos}(A_\theta; k) \ne 0 \text{ for } k=2,4,6,\ldots$$

$$S_{sin}(A_\theta; k) = \frac{1}{T}\int_0^T \sin(k\cdot 2\pi ft)\cdot\sin\{A_\theta\cdot\sin(2\pi ft)\}\,dt,$$

$$S_{sin}(A_\theta; k) \ne 0 \text{ for } k=1,3,5,\ldots$$

$$C_{sin}(A_\theta; k) = \frac{1}{T}\int_0^T \sin(k\cdot 2\pi ft)\cdot\cos\{A_\theta\cdot\sin(2\pi ft)\}\,dt = 0,$$

for $k=1,2,3,\ldots$ $$S_{cos}(A_\theta; k) = \frac{1}{T}\int_0^T \cos(k\cdot 2\pi ft)\cdot\sin\{A_\theta\cdot\sin(2\pi ft)\}\,dt = 0,$$

for $k=1,2,3,\ldots$ $$C_{cos}(A_\theta; k) = \frac{1}{T}\int_0^T \cos\{A_\theta\cdot\sin(2\pi ft)\}\,dt, \text{ for } k=0$$

$$C_{sin}(A_\theta; 0) = S_{cos}(A_\theta; 0) = S_{sin}(A_\theta; 0) = 0$$

Optimal Methods of Estimating Angle and Magnitude of Unbalanced Mass

A method of optimally estimating the angle and the unbalanced amount (U=mr, i.e., multiplication of mass and distance) from the Fourier coefficients with respect to the components of the horizontal and vertical forces measured at the support is as follows.

The theoretical results descried above for the orders of the Fourier coefficients of the horizontal and vertical forces can be expressed by the following equation of matrix form:

$$\begin{bmatrix} S_{F_X}(1) \\ S_{F_Y}(1) \\ C_{F_X}(2) \\ C_{F_Y}(2) \\ S_{F_X}(3) \\ S_{F_Y}(3) \\ C_{F_X}(4) \\ C_{F_Y}(4) \\ \square \\ \square \end{bmatrix} = A_\theta \cdot (2\pi f)^2 \begin{bmatrix} 0 & -C_{cos}(A_\theta, 0)-C_{cos}(A_\theta, 2) \\ C_{cos}(A_\theta, 1)+C_{cos}(A_\theta, 3) & 0 \\ 2S_{sin}(A_\theta, 1)+2S_{sin}(A_\theta, 3) & 0 \\ 0 & 2S_{sin}(A_\theta, 1)+2S_{sin}(A_\theta, 3) \\ 0 & -3C_{cos}(A_\theta, 2)-3C_{cos}(A_\theta, 4) \\ 3C_{cos}(A_\theta, 2)+3C_{cos}(A_\theta, 4) & 0 \\ 4S_{sin}(A_\theta, 3)+4S_{sin}(A_\theta, 5) & 0 \\ 0 & 4S_{sin}(A_\theta, 3)+4S_{sin}(A_\theta, 5) \\ \square & \square \\ \square & \square \end{bmatrix} \begin{bmatrix} U_{cos} \\ U_{sin} \end{bmatrix} \qquad \text{Eq. 10}$$

In equation 10, the left member of the equation indicates the cosine and sine components of the Fourier coefficients of the horizontal and vertical forces exerted to the support where symbol C denotes the cosine component and symbol S denotes the sine component. An unbalanced vector with the size of 2-by-1 indicates the cosine and sine components of the unbalanced amount and can be expressed as follows:

$$U_{cos}=U\cdot\cos(\theta_0)=mr\cdot\cos(\theta_0),\ U_{sin}=U\cdot\sin(\theta_0)=mr\cdot\sin(\theta_0) \qquad \text{Eq. 11}$$

Assuming that the size of vector $V_F$ is L-by-1, the matrix M has the size of L-by-2. Thus, a problem of determining the angle and magnitude of the unbalanced mass can be expressed by the following matrix:

$$V_F = M \cdot \begin{bmatrix} U_{cos} \\ U_{sin} \end{bmatrix} \quad \text{Eq. 12}$$

The matrix of the equation 12 represents a linear relationship between the Fourier coefficients of the horizontal and vertical forces measured at the support 30 and the two unknown quantities, i.e., the cosine and sine components of the unbalanced amount. From a plurality of measured values having the linear relationship, the two unknown quantities are optimally determined by the least squares method. The following equation shows a way of calculating the optimal unknown quantities.

$$\begin{bmatrix} U_{cos} \\ U_{sin} \end{bmatrix} = M^+ \cdot V_F \quad \text{Eq. 13}$$

In the equation 13, $M^+$ indicates the pseudo inverse of the matrix M. Since the pseudo inverse problem is equivalent to the inverse of 2-by-2 matrix, its calculation is accurately performed. The unbalanced amount and the angle can be estimated from the optimal, or at least 'best-fitted,' cosine and sine components of the unbalanced mass obtained as follows:

$$U = mr = \sqrt{U_{cos}^2 + U_{sin}^2}, \quad \theta_0 = \tan^{-1}\left(\frac{U_{sin}}{U_{cos}}\right) \quad \text{Eq. 14}$$

The above result is the optimal, or at least 'best-fitted,' method of estimating the unbalanced amount and the angle by measuring the components of the horizontal and vertical forces exerted to the support. In comparison to the above facts, most of the conventional balancing apparatuses used in the industry are seen to estimate the unbalanced amount and the angle by measuring only one component corresponding to the first order Fourier coefficient of the horizontal and vertical forces. To estimate the unbalanced amount and the angle using only one of the horizontal and vertical forces, the values corresponding to the non-measured terms in the equation 10 are substituted by zero, or the terms are eliminated, and then the least squares method or the above-mentioned method is readily performed or calculated. The following equation indicates the specific case that only the horizontal force component is measured.

$$\begin{bmatrix} S_{F_X}(1) \\ C_{F_X}(2) \\ S_{F_X}(3) \\ C_{F_X}(4) \\ \square \\ \square \end{bmatrix} = A_\theta \cdot \quad \text{Eq. 15}$$

$$(2\pi f)^2 \begin{bmatrix} 0 & -C_{cos}(A_\theta, 0) - C_{cos}(A_\theta, 2) \\ C_{cos}(A_\theta, 0) + C_{cos}(A_\theta, 2) & \\ & -3C_{cos}(A_\theta, 2) - 3C_{cos}(A_\theta, 4) \\ 3C_{cos}(A_\theta, 2) + 3C_{cos}(A_\theta, 4) & 0 \\ \square & \square \\ \square & \square \end{bmatrix}$$

$$\begin{bmatrix} U_{cos} \\ U_{sin} \end{bmatrix}$$

As shown in the equation 15, the cosine and sine components have the linear relationship between the Fourier coefficients of the horizontal force and the unbalance vector. Therefore, it can be understood that the optimal or at least 'best-fitted' cosine and sine components of the unbalanced mass can be also estimated from the single directional force. Of course, the angle $\theta_0$ and the magnitude U of the unbalanced amount can be calculated by the equation 14. And similarly in case that only the vertical force is measured, it is possible to estimate the optical cosine and sine components of the unbalanced mass by the same method.

Balancing Using Vibration Measurement of Support

Until now, the method of directly measuring the forces exerted to the support 30 to have the condition of a rigid body is described. If the supporting condition of the rotational shaft is designed to vibrate like the hard spring having a required rigidity, the linear relationship is still maintained between the force and the vibration. FIG. 2 shows three kinds of vibration models of the support, i.e., (a) horizontal vibration model, (b) vertical vibration model and (c) dual-axis vibration model.

The single direction models, i.e., (a) the horizontal vibration model and (b) the vertical vibration model are most widely used in the horizontal and vertical balancing apparatus, and the dual-axis vibration model is used in a precision vertical balancing apparatus, i.e., a model which needs horizontal direction rigidity. As known in the field of vibration, the vibration acceleration and the force applied to the support have a linear relationship, as follows:

$$F_X \approx m_{eff,X} \cdot a_X(t), \quad F_Y \approx m_{eff,Y} \cdot a_Y(t) \quad \text{Eq. 16}$$

In the above equation, $m_{eff}$ indicates the effective mass of a moving part in the balancing apparatus, and the effective mass is regarded as a proportional constant representing the linear relationship between the acceleration measured while a test mass is applied to a practical test piece. As well known in the field balancing, this process is referred to the "calibration" of soft-typed balancing apparatus. When the calibration is completed, the vibration acceleration component measured by the vibration sensor has a linear relationship with the force applied to the support. Therefore, the methods of estimating the angle and the magnitude of the unbalanced amount using the above-mentioned measured forces can be applied to the estimation of the angle and the unbalanced amount of the rotational body using the Fourier coefficients of output signals of the vibration. In other words, the method of estimating the angle and the unbalanced amount, in which simple harmonic rotational vibration is applied to the test piece and the single or dual axis vibration sensors are installed at the support having the required rigidity, can be carried out along the same procedure as in the estimating method by directly measuring the applied forces.

Balancing Apparatus

FIG. 3 is a configuration drawing showing the structure of a dynamic balancing apparatus using a simple harmonic angular motion.

As described in FIG. 3, the dynamic balancing apparatus using a simple harmonic angular motion of the present invention includes a rotational shaft 10 on which a rotational body 1 having a rotating unbalanced mass is installed; a simple harmonic angular vibration generator 20 for periodically vibrating the rotational shaft 10; a support 30 for supporting both sides of the rotational shaft 10; and transducers 40 for measuring applied force or vibration transferred to the support 30 by revolution of the rotational shaft 10 having the simple harmonic angular motion.

The rotational shaft 10 has the rotational body 1 having an unbalanced mass. The simple harmonic angular vibration generator 20 is installed at the rotational shaft 10 so that the rotational body 1 on the rotational shaft 10 has the simple harmonic angular motion.

The simple harmonic angular vibration generator 20 functions to periodically vibrate the rotational shaft 10 such that the rotational shaft 10 can be moved in a simple harmonic motion with the unbalanced mass of the rotational body 1.

The support 30 supports the both sides of the rotational shaft 10. The angular vibration is used to generate the applied forces, i.e., centrifugal and tangential forces, is transferred to the support 30.

The transducers 40 are installed at the support 30 so as to measure the applied force or vibration transferred to the support 30 by the simple harmonic motion of the rotational shaft 10. Thus, it is possible to estimate the angle and magnitude of the rotating unbalanced mass of the rotational body 1 using the characteristics of the applied force or vibration measured by the transducers 40.

In addition, it is preferable that the present invention further includes an angular vibration measuring sensor 50 for measuring the amplitude generated by the simple harmonic angular motion of the rotational shaft 10.

Unlike the conventional balancing apparatus, the dynamic balancing apparatus using a simple harmonic angular motion uses the periodic angular vibration generator 20 and an angular vibration measuring sensor for measuring the amplitude of the periodic angular vibration. A high-torque motor such as brushless direct current (BLDC) motors or direct driven rotary (DDR) models or electro-dynamic angular vibration exciters or precision angular motion controllers can be used as an apparatus for generating the simple harmonic angular motion. The electro-dynamic angular vibration exciter provides a wide frequency range of a few Hz to a few kHz, but has limit in generating high torque. And the high-torque motor combined with the precision angular motion controller has a limited maximum frequency of 100 Hz or less, but it is suitable for balancing of the rotational body having a large inertial moment or a heavy mass sample.

Micro-Electro-Mechanical Systems (MEMS) angular velocity sensors or angular acceleration sensors that are widely commercialized can be used as a pickup for precisely measuring the simple harmonic angular motion. Alternatively, a precision rotary encoder having a resolution of one million pulses or more may be used to directly measure an simple harmonic angular displacement. The angular vibration pickup can be used to measure the angular vibration from a low frequency of a few Hz to a few kHz, and also has a comparative low price. However, the precision rotary encoder can be used in case of having a relatively large amplitude, but it is limited in measuring the angular vibration having a frequency less than 100 Hz. Most of the high torque motors are provided with the precision rotary encoder and its dedicated controller thereof. In this case, the pickup or sensor for measuring the sample harmonic angular motion is not needed separately. However, in case that the generated angular vibration exceeds a measurement range of the rotary encoder, an individual pickup is needed.

As described above, the dynamic balancing method using a simple harmonic angular motion in the present invention can be carried out by selectively adding the periodic angular motion generator and the angular vibration measuring pickup or rotary encoder to the conventional balancing apparatus.

Conventional balancing apparatus perform the balancing only in the state that a motor is running at the constant speed. However, the dynamic balancing apparatus and method using a simple harmonic angular motion, i.e., periodic angular vibration, according to the present invention can perform the balancing even in the state that a test piece is not yet rotated one turn. Particularly, in case of fans or blowers, since the balancing can be carried out in a low vacuum state like in the rarefied air, it is possible to minimize unwanted influence of air flow generated in itself by their revolution. Also, even in case that it is impossible to directly rotate the rotational body due to its heavy weight, it can perform the balancing by selecting and applying appropriate amplitude and frequency for simple harmonic angular motion. If the balancing apparatus is additionally provided with a speed recution device so as to sufficiently increase torque, it is possible to perform the balancing of heavier objects. Furthermore, since the amplitude of the simple harmonic angular motion is small, it is possible to improve the problem of the accelerating time and the decelerating time which are accompanied with the real balancing of rotational components. Thus, since the force measured at the support is proportional to a multiplication of the vibration amplitude A and the squared frequency $f^2$, the balancing time can be reduced by properly increasing an excitation frequency even in a relatively small amplitude.

Those skilled in the art will appreciate that the conceptions and specific embodiments disclosed in the foregoing description may be readily utilized as a basis for modifying or designing other embodiments for carrying out the same purposes of the present invention. Those skilled in the art will also appreciate that such equivalent embodiments do not depart from the spirit and scope of the invention as set forth in the appended claims.

The invention claimed is:

1. A dynamic balancing method using a simple harmonic angular motion using a dynamic balancing apparatus using a simple harmonic angular motion comprising a rotational shaft on which a rotational body having an unbalanced mass is installed; a simple harmonic angular vibration generator which periodically excites the unbalanced mass; a support for supporting both sides of the rotational shaft; transducers which are installed on the support for measuring applied force or vibration generated by the simple harmonic angular vibration generator; and an angular vibration measuring sensor for measuring an amplitude generated by the simple harmonic angular motion of the rotational shaft, the method comprising:

periodically vibrating a rotational body so as to measure tangential and centrifugal forces generated by the rotating unbalanced mass of the rotational body;

measuring linear vibration generated by the tangential and centrifugal forces, or the tangential and centrifugal forces generated by the rotating unbalanced mass of the rotational body acting on the support which supports the rotational shaft having the simple harmonic angular motion;

estimating multiple Fourier coefficients of the measured tangential and the centrifugal forces; and estimating an angle and magnitude of the unbalanced mass of the rotational body by using multiple Fourier coefficients of the measured tangential and centrifugal forces generated by the simple harmonic angular vibration generator, wherein using the horizontal and/or vertical forces acting on the support is determined by the following equations $$F_X(t) = -F_t \cdot \sin(\theta(t)) + F_n \cdot \cos(\theta(t))$$
$$= -mr \cdot A_\theta \cdot (2\pi f)^2 \cdot \sin(2\pi ft) \cdot \sin\{A_\theta \cdot \sin(2\pi ft) + \theta_0\} +$$
$$mr \cdot A_\theta^2 \cdot (2\pi f)^2 \cdot \frac{1}{2}\{1 + \cos(4\pi ft)\} \cdot \cos\{A_\theta \cdot \sin(2\pi ft) + \theta_0\}$$

$$F_Y(t) = F_t \cdot \cos(\theta(t)) + F_n \cdot \sin(\theta(t))$$
$$= mr \cdot A_\theta \cdot (2\pi f)^2 \cdot \sin(2\pi ft) \cdot \cos\{A_\theta \cdot \sin(2\pi ft) + \theta_0\} +$$
$$mr \cdot A_\theta^2 \cdot (2\pi f)^2 \cdot \frac{1}{2}\{1 + \cos(4\pi ft)\} \cdot \sin\{A_\theta \cdot \sin(2\pi ft) + \theta_0\}$$

wherein $F_x(t)$ is the horizontal component of each of the tangential force and the centrifugal force acting on the support by the rotating unbalanced mass of the rotational body; $F_y(t)$ is the vertical component of each of the tangential force $F_t$ and the centrifugal force $F_n$ acting on the support by the rotating unbalanced mass of the rotational body; f[Hz] is the frequency of a simple harmonic angular vibration; $A_\theta$[radians] is the amplitude of the simple harmonic angular motion; $\theta(t)$ is the angular displacement of the rotational shaft; m[kg] is the unbalanced mass of the rotational body; r[m] is the distance of the rotating unbalanced mass of the rotational body, which is spaced apart from the rotational shaft; and $\theta_0$[radians] is the angular position in reference to the rotational shaft.

2. The dynamic balancing method of claim 1, wherein the angular position and magnitude of the rotating unbalanced mass of the rotational body are determined from multiple Fourier coefficients of the tangential and centrifugal forces generated by the rotating unbalanced mass of the rotational body, and the multiple Fourier coefficients are calculated by the following equations:

$$C_{F_X}(k) = \frac{2}{T}\int_0^T F_X(t) \cdot \cos(k \cdot 2\pi ft) dt$$
$$= \begin{cases} mr \cdot A_\theta \cdot (2\pi f)^2 \cdot \\ \{k \cdot S_{sin}(A_\theta; k-1) + & \text{for } k = 2, 4, 6, \ldots \\ k \cdot S_{sin}(A_\theta; k+1)\} \cdot \cos(\theta_0) \\ 0 & \text{for } k = 1, 3, 5, \ldots \end{cases}$$

$$S_{F_X}(k) = \frac{2}{T}\int_0^T F_X(t) \cdot \sin(k \cdot 2\pi ft) dt$$
$$= \begin{cases} mr \cdot A_\theta \cdot (2\pi f)^2 \cdot \\ \{-k \cdot C_{cos}(A_\theta; k-1) - & \text{for } k = 1, 3, 5, \ldots \\ k \cdot C_{cos}(A_\theta; k+1)\} \cdot \sin(\theta_0) \\ 0 & \text{for } k = 2, 4, 6, \ldots \end{cases}$$

$$C_{F_Y}(k) = \frac{2}{T}\int_0^T F_Y(t) \cdot \cos(k \cdot 2\pi ft) dt$$
$$= \begin{cases} mr \cdot A_\theta \cdot (2\pi f)^2 \cdot \\ \{k \cdot S_{sin}(A_\theta; k-1) + & \text{for } k = 2, 4, 6, \ldots \\ k \cdot S_{sin}(A_\theta; k+1)\} \cdot \sin(\theta_0) \\ 0 & \text{for } k = 1, 3, 5, \ldots \end{cases}$$

$$S_{F_Y}(k) = \frac{2}{T}\int_0^T F_Y(t) \cdot \sin(k \cdot 2\pi ft) dt$$
$$= \begin{cases} mr \cdot A_\theta \cdot (2\pi f)^2 \cdot \\ \{-k \cdot C_{cos}(A_\theta; k-1) + & \text{for } k = 1, 3, 5, \ldots \\ k \cdot C_{cos}(A_\theta; k+1)\} \cdot \cos(\theta_0) \\ 0 & \text{for } k = 2, 4, 6, \ldots \end{cases}$$

wherein $C_{Fx}$ is the cosine component corresponding to Fourier coefficients of the horizontal force; $S_{Fx}$ is the sine component corresponding to Fourier coefficients of the horizontal force; $C_{Fy}$ is the cosine component corresponding to Fourier coefficients of the vertical force; $S_{Fy}$ is the sine component corresponding to Fourier coefficients of the vertical force; T is the period of the simple harmonic angular motion of frequency f [Hz] (T=1/f); m[kg] is the unbalanced mass of the rotational body; r[m] is the distance of the unbalanced mass, which is spaced apart from the rotational shaft; $\theta_0$[radians] is the angular position in reference to the rotational shaft; $A_\theta$[radians] is the amplitude of the periodic angular motion; and k is an integer indicating the order of Fourier coefficients:

$$C_{cos}(A_\theta; k) = \frac{1}{T}\int_0^T \cos(k \cdot 2\pi ft) \cdot \cos\{A_\theta \cdot \sin(2\pi ft)\} dt,$$

$$C_{cos}(A_\theta; k) \neq 0 \text{ for } k = 2, 4, 6, \ldots$$

$$S_{sin}(A_\theta; k) = \frac{1}{T}\int_0^T \sin(k \cdot 2\pi ft) \cdot \sin\{A_\theta \cdot \sin(2\pi ft)\} dt,$$

$$S_{sin}(A_\theta; k) \neq 0 \text{ for } k = 1, 3, 5, \ldots$$

$$C_{sin}(A_\theta; k) = \frac{1}{T}\int_0^T \sin(k \cdot 2\pi ft) \cdot \cos\{A_\theta \cdot \sin(2\pi ft)\} dt = 0,$$

for $k = 1, 2, 3, \ldots$ $$S_{cos}(A_\theta; k) = \frac{1}{T}\int_0^T \cos(k \cdot 2\pi ft) \cdot \sin\{A_\theta \cdot \sin(2\pi ft)\} dt = 0,$$

for $k = 1, 2, 3, \ldots$ $$C_{cos}(A_\theta; k) = \frac{1}{T}\int_0^T \cos\{A_\theta \cdot \sin(2\pi ft)\} dt, \text{ for } k = 0$$

$$C_{sin}(A_\theta; 0) = S_{cos}(A_\theta; 0) = S_{sin}(A_\theta; 0) = 0.$$

3. The dynamic balancing method of claim 2, wherein the angular position and unbalanced amount (m·r) of the unbalanced mass of the rotational body are determined by the following equation using multiple Fourier cosine and sine components of both horizontal and vertical forces measured from the horizontal and vertical directions of the support:

$$\begin{bmatrix} S_{F_X}(1) \\ S_{F_Y}(1) \\ C_{F_X}(2) \\ C_{F_Y}(2) \\ S_{F_X}(3) \\ S_{F_Y}(3) \\ C_{F_X}(4) \\ C_{F_Y}(4) \\ \square \\ \square \end{bmatrix} =$$

$$A_\theta \cdot (2\pi f)^2 \begin{bmatrix} 0 & -C_{cos}(A_\theta, 0) - C_{cos}(A_\theta, 2) \\ C_{cos}(A_\theta, 1) + C_{cos}(A_\theta, 3) & 0 \\ 2S_{sin}(A_\theta, 1) + 2S_{sin}(A_\theta, 3) & 0 \\ 0 & 2S_{sin}(A_\theta, 1) + 2S_{sin}(A_\theta, 3) \\ 0 & -3C_{cos}(A_\theta, 2) - 3C_{cos}(A_\theta, 4) \\ 3C_{cos}(A_\theta, 2) + 3C_{cos}(A_\theta, 4) & 0 \\ 4S_{sin}(A_\theta, 3) + 4S_{sin}(A_\theta, 5) & 0 \\ 0 & 4S_{sin}(A_\theta, 3) + 4S_{sin}(A_\theta, 5) \\ \square & \square \\ \square & \square \end{bmatrix} \begin{bmatrix} U_{cos} \\ U_{sin} \end{bmatrix}$$

wherein $U_{cos}$ is the cosine component of the unbalanced amount ($U_{cos}=mr\cdot\cos(\theta_0)$) and $U_{sin}$ is the sine component ($U_{sin}=mr\cdot\sin(\theta_0)$), and $$U = mr = \sqrt{U_{cos}^2 + U_{sin}^2}, \quad \theta_0 = \tan^{-1}\left(\frac{U_{sin}}{U_{cos}}\right).$$

4. The dynamic balancing method of claim 2, wherein the angular position and unbalanced amount of the unbalanced mass of the rotational body are determined by the following equation using multiple Fourier cosine and sine components of the horizontal force measured from the horizontal direction of the support, $$\begin{bmatrix} S_{F_X}(1) \\ C_{F_X}(2) \\ S_{F_X}(3) \\ C_{F_X}(4) \\ \square \\ \square \end{bmatrix} =$$

$$A_\theta \cdot (2\pi f)^2 \begin{bmatrix} 0 & -C_{cos}(A_\theta, 0) - C_{cos}(A_\theta, 2) \\ C_{cos}(A_\theta, 0) + C_{cos}(A_\theta, 2) & 0 \\ 0 & -3C_{cos}(A_\theta, 2) - 3C_{cos}(A_\theta, 4) \\ 3C_{cos}(A_\theta, 2) + 3C_{cos}(A_\theta, 4) & 0 \\ \square & \square \\ \square & \square \end{bmatrix} \begin{bmatrix} U_{cos} \\ U_{sin} \end{bmatrix}$$

wherein $U_{cos}$ is the cosine component of the unbalanced amount ($U_{cos}=mr\cdot\cos(\theta_0)$) and $U_{sin}$ is the sine component ($U_{sin}=mr\cdot\sin(\theta_0)$), and $$U = mr = \sqrt{U_{cos}^2 + U_{sin}^2}, \quad \theta_0 = \tan^{-1}\left(\frac{U_{sin}}{U_{cos}}\right).$$

5. The dynamic balancing method of claim 2, wherein the angular position and unbalanced amount of the unbalanced mass of the rotational body are determined by the following equation using multiple Fourier cosine and sine components of the vertical force measured from the vertical direction of the support, $$\begin{bmatrix} S_{F_Y}(1) \\ C_{F_Y}(2) \\ S_{F_Y}(3) \\ C_{F_Y}(4) \\ \bullet \\ \bullet \end{bmatrix} =$$

$$A_\theta \cdot (2\pi f)^2 \begin{bmatrix} C_{cos}(A_\theta, 1) + C_{cos}(A_\theta, 3) & 0 \\ 0 & 2S_{sin}(A_\theta, 1) + 2S_{sin}(A_\theta, 3) \\ 3C_{cos}(A_\theta, 2) + 3C_{cos}(A_\theta, 4) & 0 \\ 0 & 4S_{sin}(A_\theta, 3) + 4S_{sin}(A_\theta, 5) \\ \bullet & \bullet \\ \bullet & \bullet \end{bmatrix} \begin{bmatrix} U_{cos} \\ U_{sin} \end{bmatrix}$$

wherein $U_{cos}$ is the cosine component of the unbalanced amount ($U_{cos}=mr\cdot\cos(\theta_0)$) and $U_{sin}$ is the sine component of the unbalanced amount ($U_{sin}=mr\cdot\sin(\theta_0)$), and $$U = mr = \sqrt{U_{cos}^2 + U_{sin}^2}, \quad \theta_0 = \tan^{-1}\left(\frac{U_{sin}}{U_{cos}}\right).$$

6. The dynamic balancing method of claim 1, wherein it exploits horizontal and/or vertical vibration signals that linearly depend on the horizontal and/or vertical components of the tangential and centrifugal forces acting on the support when the unbalanced mass of the rotational body is running, whose outputs of vibration measurement sensors are characterized by the following equation:

$$F_X \approx m_{\mathit{eff},X} \cdot a_X(t), \; F_Y \approx m_{\mathit{eff},Y} \cdot a_Y(t)$$

$m_{\mathit{eff}}$ is an effective mass of each vibration measurement direction, and $a_X(t)$ and $a_Y(t)$ are the measured vibration acceleration signals that satisfy a linear relationship between the measured vibration accelerations and the tangential and centrifugal forces acting on the support and the measured vibration acceleration signals from the support are used to determine the angular position and magnitude of an unbalanced mass by installing vibration transducers in the horizontal and/or vertical movement directions of the support, and Fourier coefficients of the horizontal and vertical force components are evaluated for implementing vibration measurement-based dynamic balancing.

* * * * *